United States Patent [19]

Weber et al.

[11] Patent Number: 5,176,925
[45] Date of Patent: Jan. 5, 1993

[54] EXTRUSION DIE WITH STATIC MIXER INSERT

[75] Inventors: Keith B. Weber, Yalesville; Robert L. Baran, Plymouth, both of Conn.

[73] Assignee: Amphenol Corporation, Wallingford, Conn.

[21] Appl. No.: 857,434

[22] Filed: Mar. 25, 1992

[51] Int. Cl.⁵ .............................................. B29C 47/14
[52] U.S. Cl. .................................... 425/191; 425/206; 425/382.4; 425/461; 425/467
[58] Field of Search .................. 425/133.5, 382.4, 461, 425/467, 466, 206, 462, 463, 464, 191, 192 R; 264/176.1, 108

[56] References Cited

U.S. PATENT DOCUMENTS

| | | | |
|---|---|---|---|
| 2,702,408 | 2/1955 | Hartland | 425/382.4 |
| 3,834,849 | 9/1974 | Supran et al. | 425/461 |
| 3,918,867 | 11/1975 | Beyer | 425/461 |
| 4,197,069 | 4/1990 | Cloeren | 264/176 R |
| 4,217,322 | 8/1980 | Sugano et al. | 425/133.5 |
| 4,364,722 | 12/1982 | Phipps | 425/461 |
| 4,883,421 | 11/1989 | Morgan | 425/382.4 |
| 5,059,371 | 10/1991 | Saheki et al. | 425/382.4 |

FOREIGN PATENT DOCUMENTS 57-36624  2/1982  Japan ................................. 425/467

*Primary Examiner*—Jay H. Woo
*Assistant Examiner*—Khanh P. Nguyen
*Attorney, Agent, or Firm*—Bacon & Thomas

[57] ABSTRACT

A die for use in an extrusion process is disclosed wherein the die is formed with a flow channel, a portion of which is defined by a removable insert. The insert includes a static mixer arrangement over a predetermined portion thereof in order to create a turbulence in the extruded material to produce a sheet or film having a uniform cross-section. The static mixer arrangement can be included of variously shaped projections which are secured to respective removable inserts. Since the insert defines a portion of the flow channel, the size and shape of the land associated with the die can also be varied.

16 Claims, 2 Drawing Sheets

EXTRUSION DIE WITH STATIC MIXER INSERT

BACKGROUND OF THE INVENTION

1. Field of the Invention

The present invention pertains to the art of extrusion and, more particularly, to a die for use in an extrusion process.

2. Discussion of the Prior Art

In extruding a synthetic resin film, it is highly desirable to obtain a substantially uniform cross-section of the sheet or film. When extruding polymer films, for example, the natural tendency is for the warmest portion of the flowing material to travel more rapidly in the center of the flow channel of the die while the coolest portion of the melt travels more slowly along the outer part of the channel. This, of course, results in the formation of an undesirable non-uniform cross-section.

In one known prior art arrangement, as represented by U.S. Pat. No. 4,217,322, the die is designed to split the extruded material into two streams adjacent the entrance to the die. The two streams are then caused to flow along the edges of the die and are joined again upstream behind a dam. The dam is a narrow restriction just behind the outlet of the die. This type of arrangement has become known as a "coat hanger die".

By first splitting and then restricting the melt stream, a coat hanger type die achieves a substantially uniform flow of the melt from the die. Unfortunately, the use of the dam creates an area of high shear. Since the shear rate over the dam is inversely proportional to the square of the restriction height, as the dam becomes more restricted, the shear rate increases. Since the dam must be restricted to provide the uniform flow, a rather large shear rate is inherent in such a die arrangement. This may not present a problem in extruding various materials, however, it does create a problem in the extrusion of sheets or films which are formed from shear sensitive thermoplastic polymers such as FEP (Fluroinated Ethylene Propylene).

It has heretobefore been proposed to provide a static mixer to create a more uniform melt flow in these known coat hanger dies. These mixers are usually located within the barrel of the extruder, downstream from the end of the extruder screw. These mixers function by creating a turbulent flow in the melt stream in an attempt to prevent the gradient flow velocity described above. Unfortunately, once the molten polymer leaves the mixer, it immediately begins to form temperature gradients which again lead to non-uniform flow rates.

Therefore, there exists a need in the art for an extrusion die which can produce a sheet or film of uniform melt flow and which overcomes the problems associated with the prior art. In particular, there exists a need for a die which can be used to extrude a thermoplastic polymer material having a uniform cross-section without increasing shear rates.

SUMMARY OF THE INVENTION

The present invention pertains to a die for use in producing an extruded sheet or film having a uniform thickness and melt flow. More particularly, the present invention contemplates the direct extrusion of a thin cross-section film from shear sensitive thermoplastic polymers by incorporating a low shear static mixer in the extrusion die. The static mixer is located downstream of the inlet to the die and takes the form of a plurality of projections which extend upwardly from a base portion of the die. In a preferred embodiment, these projections extend upwardly from a removable insert which forms a portion of the die flow channel. The insert also defines the land of the die and therefore, by providing different inserts, not only the particular shape, number and distance between the projections can be varied, but also the length of the die land.

Further details and advantages of the present invention will be more readily apparent in the discussion of preferred embodiments of the invention with reference to the following figures.

DETAILED DESCRIPTION OF THE PREFERRED EMBODIMENTS

Figure 1:
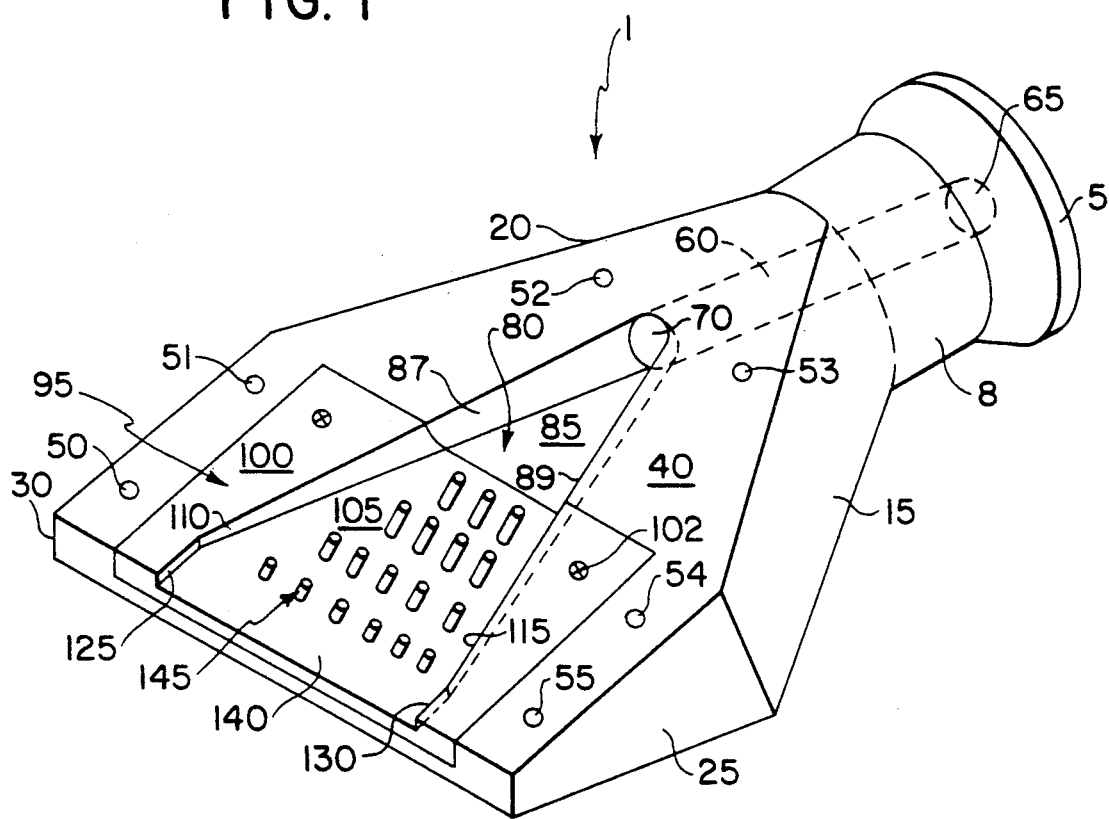
FIG. 1 shows a prospective view of the die according to the present invention.

With initial reference to FIG. 1, shown therein is a die according to the present invention. The die includes a main body portion 1 and a cover member (not shown) as will be described in detail below. Main body portion 1 includes a connector head 5 for use in securing main body portion 1 to an extruder by any means known in the art. Main body portion 1 further includes an annular shaft portion 8 integrally formed with connector head 5, a pair of opposing, diverging side wall portions 15, 20 and a pair of opposing, substantially parallel side wall portions 25, 30.

As previously stated, the die of the present invention is formed of main body portion 1 and a cover section (not shown) which is adapted to be fixed to upper surface 40 of main body portion 1 by means of holes 50-55 formed in upper surface 40. Main body portion 1 includes a longitudinally extending flow conduit 60 having an inlet port 65 formed in connector head 5 and an outlet port 70. Outlet port 70 opens into a flow channel 80 which includes a first channel portion having a base 85 and side walls 87, 89 and a second channel portion defined by an insert 95. Insert 95 includes a top surface portion 100 which is co-planar flush with upper surface 40 of main body portion 1. Insert 95 is fixedly secured to main body portion 1 by any means known in the art such as screws 102. Insert 95 includes a base 105 which is co-planar with first base portion 85. Insert 95 further includes a pair of opposing, diverging side wall portions 110, 115 and terminating wall portions 125, 130 as will be discussed more fully below.

As shown in FIG. 1, side walls 87 and 89 of the first channel portion and side wall portions 110, 115 of insert 95 not only diverge from adjacent outlet port 70 longitudinally of main body portion 1, but also converge along their lengths to a height defining the vertical distance between a land 140, formed at the end of insert 95, and top surface 100, i.e., the height of terminating wall portions 125, 130. Obviously, the height of terminating wall portions 125, 130 define the thickness of the sheet or film to be extruded.

Figure 2:
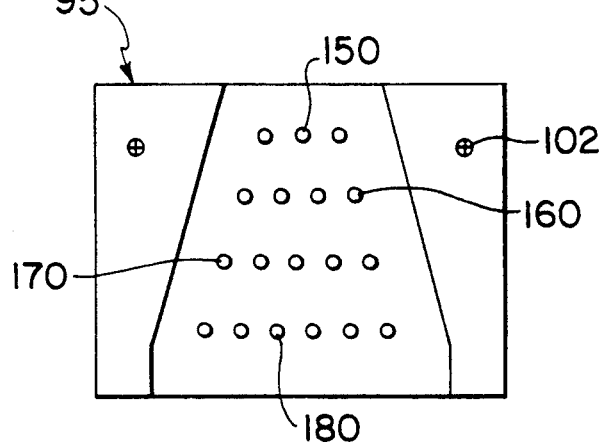
FIG. 2 shows a top view of the insert mounted in the die of FIG. 1.

With reference to FIGS. 1 and 2, fixedly secured to and extending upwardly from base 105 of insert 95 is a static mixer arrangement in the form of upstanding projections 145. In this embodiment, projections 145 take the form of upstanding cylindrical pins which are composed of first, second, third and fourth longitudinally spaced sets 150, 160, 170 and 180 respectively. As shown, the pins in each set are substantially, equally spaced as are each set of pins. The height of the pin between sets 150, 160, 170 and 180 vary to correspond to the height of diverging sidewall portions 110 and 115. In addition, the tops of the pins are formed co-planar with top surface 100 of insert 95. Therefore, when the cover member is secured to upper surface 40 of main body portion 1, the tops of each pin in pin sets 150, 160, 170 and 180 will abut or at least extend closely adjacent to the underside of the cover member.

Figure 3:
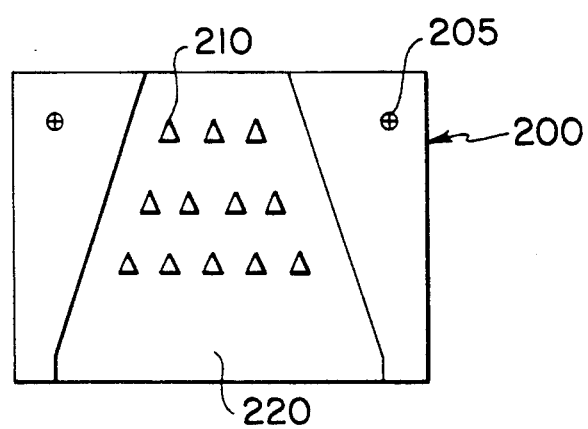
FIG. 3 shows a top view of a die insert according to a second embodiment of the invention.

FIG. 3 represents a second insert embodiment according to the invention generally indicated at 200. Insert 200 has two laterally spaced holes 205 formed therethrough for removably securing insert 200 to main body 1 in the same manner described above with reference to the insert embodiment shown in FIGS. 1 and 2. The FIG. 3 embodiment is intended to show various additional aspects of the present invention. First, projections 210 of insert 200 are triangular in shape. Each triangular shaped projection 210 includes an apex which is aligned perpendicular to the direction of flow so as to readily divert the material thereabout. Second, insert 200 is formed with a shorter land width. Therefore, the FIG. 3 embodiment illustrates that differently shaped projections can be formed on the insert and the insert can be shaped so as to enable selection of lands having varying widths. In addition, the number of rows of projections 210 can be varied.

Figure 4:
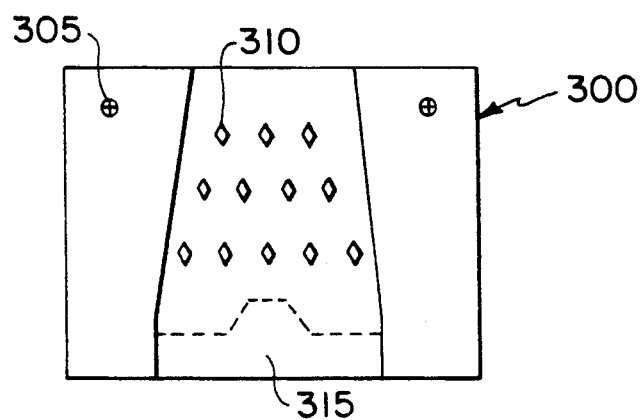
FIG. 4 shows a top view of a die insert according to a third embodiment of the invention.

FIG. 4 represents a third insert embodiment according to the present invention generally indicated at 300. Like inserts 95 and 200, insert 300 includes means for attaching the insert to main body portion 1 such as holes 305 for receiving screws 102. Insert 300 of FIG. 3 depicts projections 310 which are substantially diamond-shaped and is formed with a land area 315 which is longer in the center of the flow channel (as indicated by the dotted line) to aid in reducing flow through the center of the die without increasing shear.

By the above description, it can be readily seen that various inserts having various shapes can be used with a single main die body portion in order to control the flow characteristics of the extruded material through the die depending upon the particular material used or thickness desired. The static mixer functions to create a turbulent flow of the extruded melt in a downstream portion of the flow channel to prevent the type of flow gradients associated with the prior art as discussed above. In the preferred embodiment, the volumetric flow area present at outlet port 70 is maintained constant along the entire length of the flow channel by the use of the diverging walls 87, 89, 110 and 115 with varying heights as discussed above. It is also possible to have the volumetric flow area decrease from outlet port 70 to the end of the extrusion die to provide a slight back pressure if desired.

Although various preferred embodiments of the invention have been described, it is to be understood that various changes and/or modifications can be made without departing from the spirit of the invention. In general, the invention is only intended to be limited by the scope of the following claims.

We claim:

1. A die for use in an extrusion process comprising a main body portion having an input flow conduit opening into a longitudinally extending flow channel, said flow channel having a base portion with a static mixer section and upstanding side walls, said static mixer section including a plurality of projections extending upwardly from said base portion, at least some of said projections being longitudinally spaced within said static mixer section.

2. A die as claimed in claim 1, wherein said plurality of projections are inwardly spaced from said side walls.

3. A die as claimed in claim 2, wherein said longitudinally spaced projections vary in height.

4. A die as claimed in claim 3, wherein said plurality of projections comprise cylindrical pins.

5. A die as claimed in claim 3, wherein said plurality of projections are triangular in cross-section.

6. A die as claimed in claim 3, wherein said plurality of projection are diamond-shaped in cross-section.

7. A die as claimed in claim 3, further comprising an insert removably secured to said main body portion, said static mixer section being formed on said insert.

8. A die as claimed in claim 7, wherein said insert is formed with an extrusion land, said plurality of projections being longitudinally spaced from said land.

9. A die as claimed in claim 2, wherein said side walls of said flow channel diverge over a predetermined portion thereof from said inlet conduit.

10. A die for use in an extrusion process comprising a main body portion having an input flow conduit opening into a longitudinally extending flow channel, at least a portion of said flow channel being defined by and comprising a removable insert wherein said insert includes a base portion and upstanding side walls and further comprising a static mixer comprising a plurality of longitudinally spaced projection extending upwardly from said base portion.

11. A die as claimed in claim 10, wherein said plurality of projections are inwardly spaced from said side walls.

12. A die as claimed in claim 11, wherein said longitudinally spaced projections vary in height.

13. A die as claimed in claim 12, wherein said plurality of projections comprise cylindrical pins.

14. A die as claimed in claim 12, wherein said plurality of projections are triangular in cross-section.

15. A die as claimed in claim 12, wherein said plurality of projection are diamond-shaped in cross-section.

16. A die as claimed in claim 10, wherein said insert is formed with an extrusion land, said plurality of projections being longitudinally spaced from said land.

* * * * *